(12) United States Patent
Tsuchiya et al.

(10) Patent No.: US 7,092,187 B2
(45) Date of Patent: Aug. 15, 2006

(54) MAGNETIC RECORDING AND REPRODUCING APPARATUS AND METHOD AND THIN FILM MAGNETIC HEAD USED THEREIN

(75) Inventors: Toshio Tsuchiya, Mito (JP); Kenkichi Inada, Hitachinaka (JP); Akihisa Obata, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 148 days.

(21) Appl. No.: 10/633,719

(22) Filed: Aug. 5, 2003

(65) Prior Publication Data

US 2004/0080855 A1   Apr. 29, 2004

(30) Foreign Application Priority Data

Aug. 5, 2002   (JP) ............................. 2002-226805

(51) Int. Cl.
*G11B 15/14* (2006.01)
(52) U.S. Cl. .................. 360/64; 360/62; 360/73.04
(58) Field of Classification Search .............. 360/62, 360/64, 77.14, 77.15, 18–21
See application file for complete search history.

(56) References Cited

U.S. PATENT DOCUMENTS

| | | | | |
|---|---|---|---|---|
| 5,412,520 A | * | 5/1995 | Saito | 360/77.15 |
| 5,424,886 A | * | 6/1995 | Tomitaka | 360/77.01 |
| 6,141,166 A | * | 10/2000 | Ozue | 360/64 |
| 6,172,831 B1 | * | 1/2001 | Usui | 360/64 |
| 6,278,569 B1 | * | 8/2001 | Fukuda | 360/64 |
| 6,433,945 B1 | * | 8/2002 | Norton, Jr. | 360/46 |
| 6,801,379 B1 | * | 10/2004 | Ozue et al. | 360/55 |
| 6,922,298 B1 | * | 7/2005 | Ozue | 360/64 |

FOREIGN PATENT DOCUMENTS

JP   2001-229516   8/2001

* cited by examiner

*Primary Examiner*—William Korzuch
*Assistant Examiner*—Adam R. Giesy
(74) *Attorney, Agent, or Firm*—Antonelli, Terry, Stout and Kraus, LLP.

(57) ABSTRACT

The present invention provides a magnetic recording and reproducing apparatus, a magnetic recording and reproducing method, and a thin film magnetic head that enable a good contact between elements and a recording medium with a reduced track pitch even if the number of head channels is increased, thereby realizing high recording density and high transfer rate.

At least one multitrack write head having N (N is an integer of 2 or more) write elements arranged along a track width direction in an integral fashion and at least one multitrack read head having L (L is an integer equal to or more than N) read elements arranged along the track width direction in an integral fashion are formed on the rotary drum. The multitrack write head writes signals to a group of N tracks aligned parallel on the magnetic tape during one rotation of the rotary drum, and the multitrack read head reads the group of N signal tracks by the use of any one of the L read elements.

14 Claims, 11 Drawing Sheets

MAGNETIC RECORDING AND REPRODUCING APPARATUS AND METHOD AND THIN FILM MAGNETIC HEAD USED THEREIN

BACKGROUND OF THE INVENTION

1. Field of the Invention

The present invention relates to a magnetic recording and reproducing apparatus and a magnetic recording and reproducing method of the helical scan system to be used for writing and reading signals to and from a magnetic tape, and particularly to a thin film magnetic head having a multitrack structure for high density recording.

2. Description of the Related Art

High density recording in a magnetic recording apparatus using a magnetic tape has been achieved by narrowing a track width and increasing the number of channels. Positions of track ends of write heads arranged on a rotary drum are adjusted so that a width of each of write tracks formed on a recording medium is set to a predetermined value. However, it is difficult to precisely set the write track widths due to influences of precision in mounting height of the write heads, run-out of the rotary drum, wow flutter, and the like.

In view of the above, Japanese Patent Laid-open No. 2001-229516 discloses a technique of controlling a ratio of a tape feed amount to a rotary drum to be a predetermined value by mounting a read/write head having a plurality of head elements arranged on a rotary drum with predetermined interval. According to this technique, since information is written to or read out from a plurality of tracks at one time, it is possible to perform stable and reliable recording and reproduction without increasing error in track pitch which would be otherwise caused when errors in mounting the head elements are accumulated.

SUMMARY OF THE INVENTION

In the technique disclosed in the above-mentioned publication, repetition interval of the head elements is substantially proportional to the number of head elements. If the number of head elements arranged in one head is increased in order to improve a transfer rate, the interval is increased to make it difficult to achieve a satisfactory contact between each of the elements and a tape. Also, since adjacent write tracks are not formed by one scanning, a plurality of times of scannings (drum rotations) are required for forming a pattern of consecutive write tracks. Therefore, high precision formation of the write track widths may be prevented due to factors such as variations among tape tensions and tape feed rates in the scannings.

An object of the present invention is to provide a magnetic recording and reproducing apparatus, a magnetic recording and reproducing method, and a thin film magnetic head capable of realizing high density and high transfer rate recording by eliminating factors for error in effective track pitch, and readily achieving good contact between each of elements and a recording medium with a reduced track pitch even if the number of head channels is increased.

In order to attain the above object, in the magnetic recording and reproducing apparatus of the present invention, a rotary drum is provided with at least one multitrack write head having N (N is an integer of 2 or more) write elements arranged along a track width direction in an integral fashion and at least one multitrack read head having read elements arranged along the track width direction in an integral fashion, the number of the read elements being an integral multiple of N. The multitrack write head writes signals to a group of N signal tracks aligned parallel on the magnetic tape during one rotation of the rotary drum, and the multitrack read head read the group of N signal tracks by the use of any one of the read elements, the number of the read elements being L (an integer equal to or more than N).

As used herein, the write elements of the multitrack write head and the read elements of the multitrack read head have an identical azimuth angle; a read width of the read elements of the multitrack read head is set to substantially ½ of a signal track width formed on the magnetic tape; and repetition interval of the read elements in the track width direction is set to ½ of a signal track pitch, thereby enabling the multitrack read head to read the signals from the group of signal tracks in accordance with a non-tracking system.

The thin film magnetic head of the present invention is a multitrack thin film magnetic head having a plurality of magnetic write elements formed on a substrate, wherein n-th (n is a natural number) thin film magnetic write element and (n+1)-th thin film magnetic write element are formed on the substrate with a predetermined distance in the track width direction being defined therebetween and a protection film extending in a direction of film deposition being formed therebetween.

BRIEF DESCRIPTION OF THE SEVERAL VIEWS OF THE DRAWING

These and other objects, features and advantages of the present invention will become more readily apparent from the following detailed description when taken in conjunction with the accompanying drawings wherein.

DETAILED DESCRIPTION OF THE INVENTION

One embodiment of a magnetic recording and reproducing apparatus according to the present invention will hereinafter be described with reference to the drawings.

Figure 1:
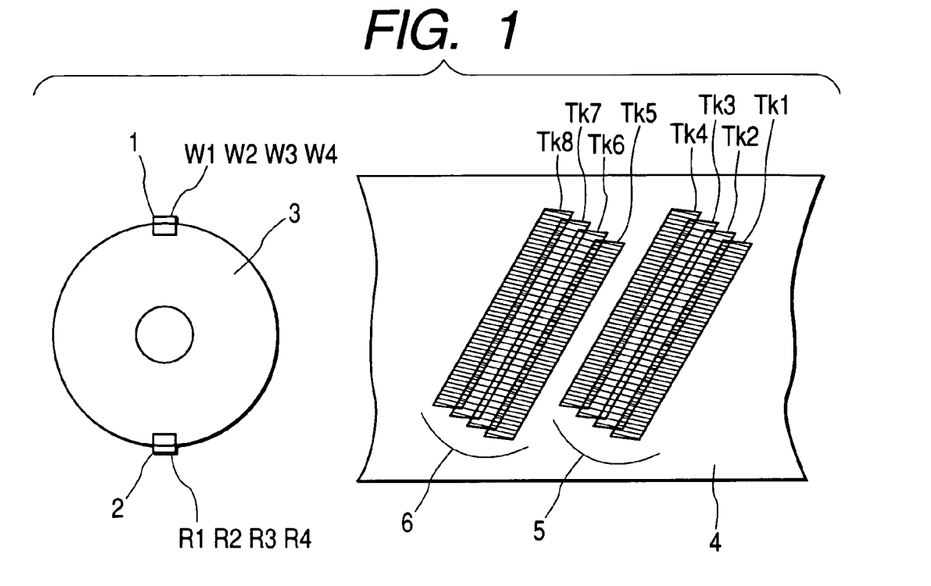
FIG. 1 is a conceptual diagram for illustrating write tracks of a magnetic recording and reproducing apparatus of the present invention.

FIG. 1 is a conceptual diagram for illustrating write tracks in the magnetic recording and reproducing apparatus of the present invention. A multitrack write head 1 having a plurality of tracks (write elements W1, W2, W3, W4) and a multitrack read head 2 having a plurality of tracks (read elements R1, R2, R3, R4) are mounted on a rotary drum 3 as opposed to each other by 180 degrees. A group of write tracks 5 (Tk1, Tk2, Tk3, Tk4) of an identical azimuth are formed on a magnetic tape 4 during one rotation of the rotary drum 3, and a group of tracks (Tk5, Tk6, Tk7, Tk8) are formed on the magnetic tape 4 during a subsequent rotation of the rotary drum 3.

Figure 2:
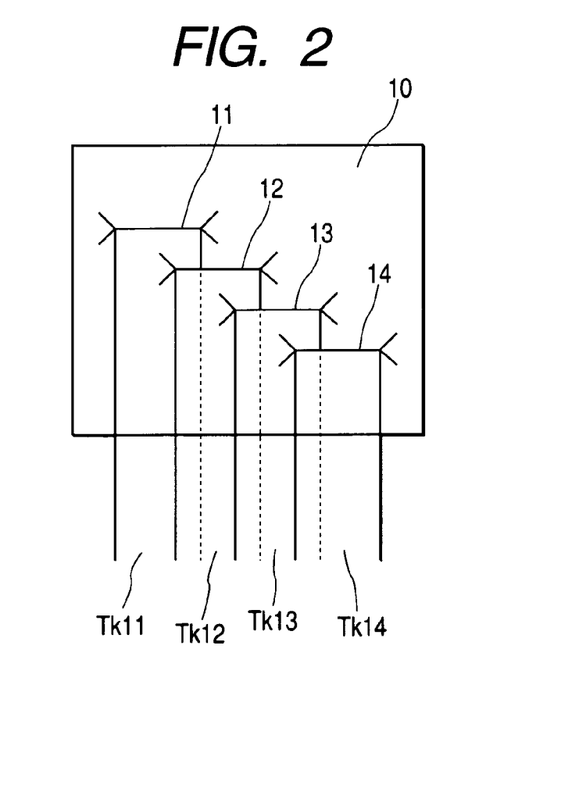
FIG. 2 is a diagram for illustrating a write head and a write track pattern in FIG. 1.

Referring to FIG. 2, more detailed description of a relationship between the write head 1 and a pattern of the write tracks 5 and 6 shown in FIG. 1 will hereinafter be given. A multitrack thin film write head 10 which is fabricated by a process described later in this specification is used as the write head 1. The fabrication process includes: forming a first thin film write element 11 having a track width of 1.5 µm; forming a protection film; forming a second thin film write element 12 on a flattened surface of the protection film with a shift of 1 µm in a direction of the track width; forming a second protection film; and forming a third thin film write element 13 on a flattened surface of the second protection film with a shift in the same manner as described above. By repeating the above process steps, four layers of thin film write elements are formed along the track width direction with repetition interval of 1 µm between adjacent elements. In this embodiment, the thus-obtained multitrack thin film write head 10, not a plurality of the multitrack thin film write heads, having the four thin film write elements is provided on the rotary drum.

A write track formed when the first write element 11 of the multitrack head scans a medium has a width of about 1.5 µm. After that, the second write element 12 forms a second write track with a shift of 1 µm from the first write track. In this case, a portion of about 0.5 µm of the first write track is overwritten, so that signals written by the second write element 12 remain on the portion to form a first track Tk11 to which a first signal component is written. Since the first write element and the second write element are adjacent to each other to form the multitrack head in the integral fashion, positions of the first write element and the second element are not influenced by head height adjustment precision of the rotary drum, run-out, and tape wow flutter; therefore, the write track Tk11 is formed with the high precision with which the magnetic head has been formed.

A group of four tracks (Tk11, Tk12, Tk13, Tk14) of an identical azimuth with the shift of 1 µm being provided between the adjacent tracks are formed when the third and fourth write elements 13 and 14 form write tracks in the similar manner (the preceding write track is overwritten by the succeeding write track). In this case, since the track Tk14 written by the fourth write element 14 is not overwritten by a subsequent write element yet at this time point, the track Tk14 has a track width whose dimension is substantially the same as that of the fourth write element. Also, since the write elements are not sporadic but are close to one other, it is easy to attain good contact between each of the write elements and the tape.

Figure 3:
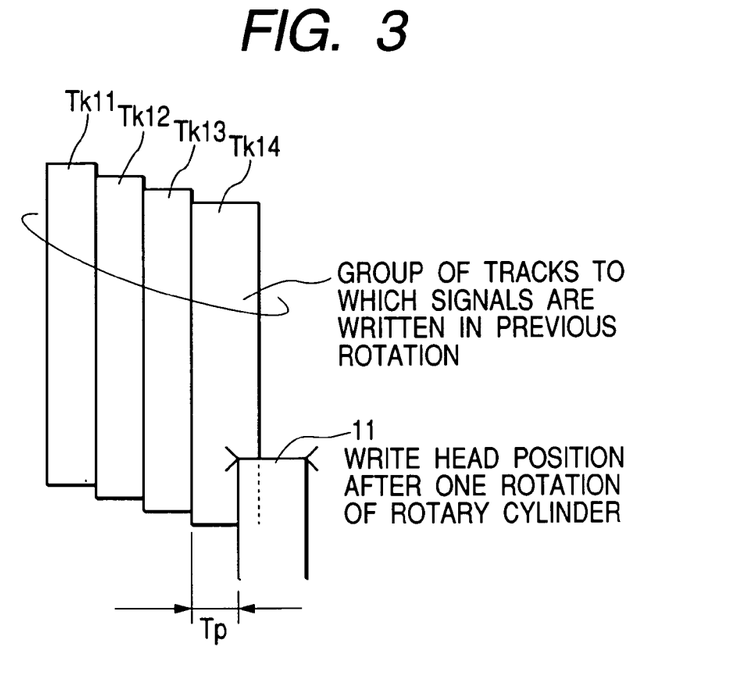
FIG. 3 is a diagram for illustrating a write head and a write track pattern in FIG. 1.

A tape pitch of the magnetic tape in the track width direction during one rotation (rotation of 360 degrees) of the rotary drum corresponds to a multiple of the number (=N) of write heads, i.e., the tape pitch is 4 µm (1 µm×4) in this embodiment. Accordingly, as shown in FIG. 3, a portion of the fourth write track Tk14 written previously is overwritten by the first write head 11 mounted on the rotary drum, and, after that, a second group of write tracks are formed in the same manner. Here, if a tape feed amount is controlled which depends on the tape pitch to be that obtained by adding a value corresponding to a tape wow flutter to the tape feed amount, it is possible to prevent a write width of the fourth write track from being reduced due to the excessive overwriting by the first write element after one rotation.

Although the multitrack head 1 (a pair of multitrack heads) is mounted on the rotary drum in this embodiment, M (an integer of 2 or more) multitrack heads may be mounted on the rotary drum. When M multitrack heads are used, tracks of M groups each consisting of N tracks are formed by one rotation of the rotary drum. In this case, if the tape feed amount is controlled that is obtained by adding values corresponding to height adjustment precision of the heads, run-out, and wow flutter to a tape feed amount calculated from the track pitch, it is possible to prevent the track widths formed last in the groups of tracks from being overwritten excessively, thereby preventing widths for signals to remain in from being reduced.

The recording density is improved also in the case of using M multitrack heads as follows. In the following description, d represents an error in write track formation position and W represents a minimum track width. If M×N conventional heads are arranged on a rotary drum, a width in the track width direction required for writing M×N tracks in a conventional example is (W+d)×M×N. In turn, the required width is W×M×N+M×d in this embodiment. More specifically, if N is 2 or more, it is possible to reduce an amount of medium required for the writing. Moreover, if one multitrack head is used (M=1), the required track width is W×M×N, thereby enabling to achieve higher recording density.

Figure 4:
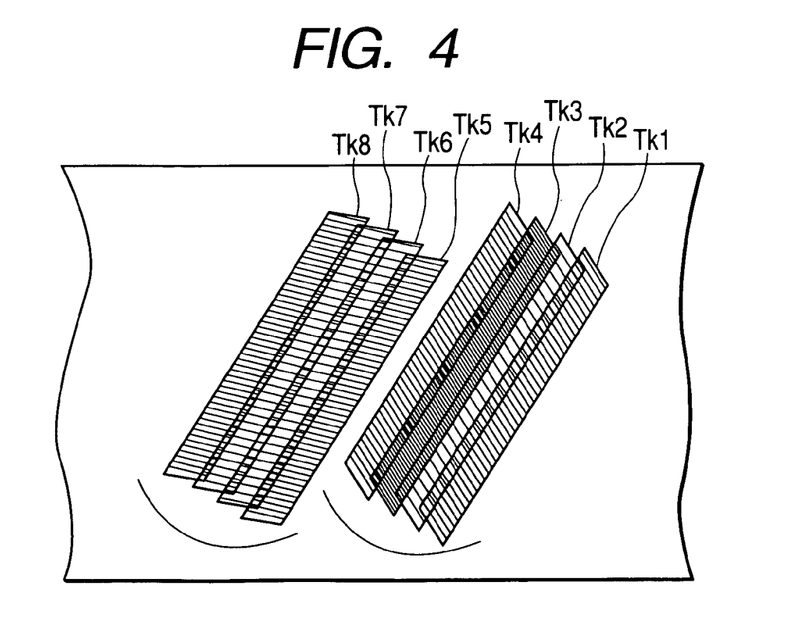
FIG. 4 is a diagram showing a write pattern different from that shown in FIG. 1.

The azimuth relationship among the M groups of tracks is not limited. As shown in FIG. 4, tracks of different azimuth may be combined. With this constitution, selecting azimuth angles for the first group of tracks and the second group of tracks allows to achieve a head structure for reading signal tracks written in accordance with other systems.

In contrast, if azimuth angles of all the tracks are identical to one another, such tracks are advantageous in attaining effective use of the head and in improving the transfer rate when used in accordance with the non-tracking system as described later in conjunction with read operation, since it is possible to read signals in all the tracks by the use of one of the read elements.

Several systems relating to a method of reading signals from tracks will hereinafter be described. A servo signal system wherein a plurality of servo signals are written as reference signals to a region designated by way of a distance from a tape bottom end in at least one track belonging to a group of tracks of the same azimuth may be employed. Used as a read head is a multitrack MR head on which N magnetoresistive effect elements (MR elements) having an effective read width smaller than a write track width are arranged with repetition interval identical with that of elements of a multitrack write head. In the read operation, when the servo signals are read, it is possible to calculate an amount of shift between track scannings of the head and the medium from a position of the head that has read the signals and a time phase. More specifically, if a tape feed rate is too high, time required for the reading is observed as fast, while the observed time is slow if the tape feed rate is low. If the tape feed rate is controlled in such a manner that the shift amount is maintained at a predetermined value, it is possible to allow the read head to scan on the write tracks.

Figure 5:
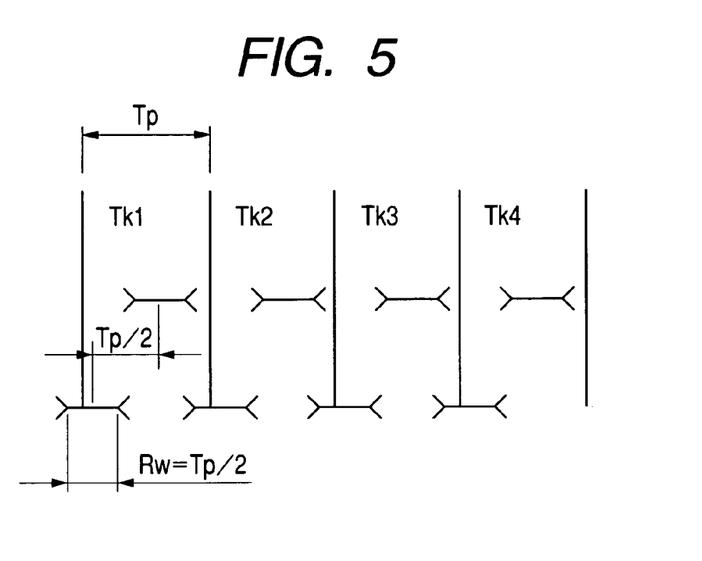
FIG. 5 is a diagram for illustrating a read head and write tracks in FIG. 1 (non-tracking system)

If the track width is narrowed to the smallest value, the non-tracking system is employed so that the necessity for controlling the tape medium feed rate with high precision is eliminated. As shown in FIG. 5, the read width of each of the read elements is set to substantially ½ of the written track width and repetition interval of the read elements in the track width direction is set to ½ of the write track pitch. Thus, it is possible that all the signal tracks are scanned by any one of the read elements at least once. More specifically, operation of invariably reading the signal track in the state of on-track wherein no adjacent track is read is realized without high precision tracking.

Figure 6:
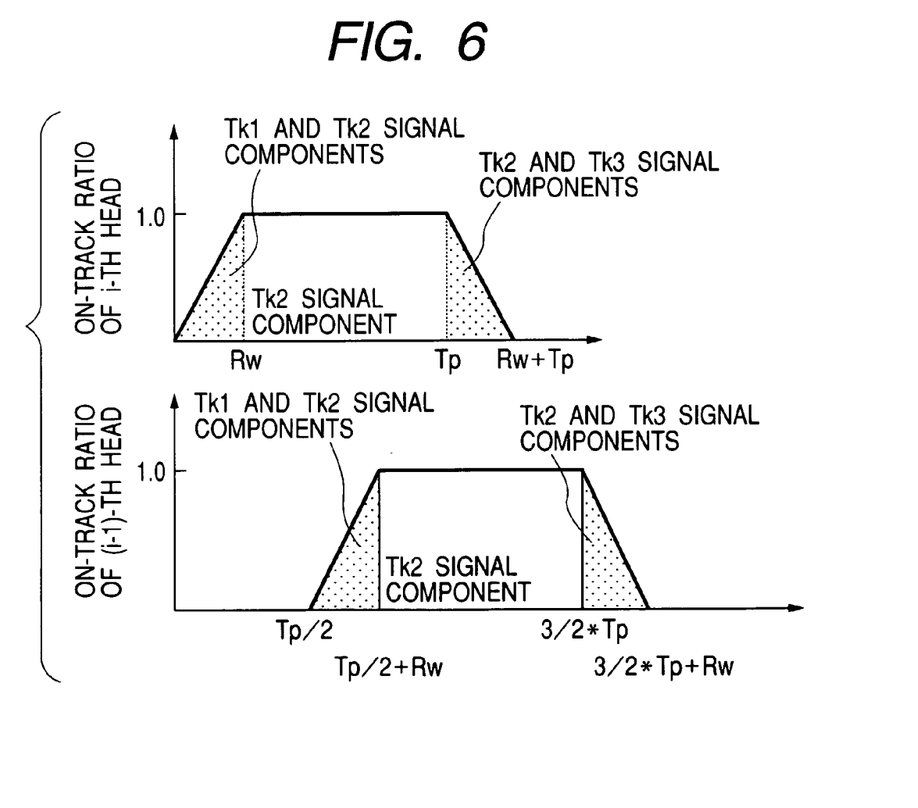
FIG. 6 is a diagram for illustrating tracking in accordance with the non-tracking system.

This read operation will be described with reference to FIG. 6. Illustrated in FIG. 6 are a write pattern and tracing of the read elements at the time of tracking offset. Referring to FIG. 6, Rw represents a read width of each of the read elements, and repetition interval of the read elements is Tp/2. In FIG. 6, i-th read element is displaced in tracking from a write track Tk1 to a write track Tk2, and the start point of x axis is set to a point where the i-th element reaches the write track Tk2. The i-th element tracks on both of Tk1 and Tk2 to read signals from the tracks during a period from the displacement to when an off-track amount reaches Rw, so that the signals read out during this period are not used for data decoding. After that, the i-th element reads only the signal component of Tk2 during a period from the off-track state to TP, so that the read signals read out during this period are used for data decoding. When off-track further proceeds, the i-th element tracks on both of Tk2 and Tk3 to read signals, so that the signals read out during this period are not used for data decoding. However, since (i−1)-th and (i+1)-th read elements are formed at positions each of which is shifted from the i-th element by ½ times of Tp in the track direction, either one of the (i−1)-th and (i+1)-th read elements reads in the on-track state the signals that have been read by the i-th element during the period from the displacement to Rw and have not been used for data decoding. By setting the tape feed amount in the read operation to be less than that of the write operation, it is possible to perform at least one scanning without fail at the instable transition point where the on-track states of the heads change from one to another, thereby attaining stable operation of reading signals.

Alternatively, a pilot signal system wherein pilot signals having different frequencies are written to each of N tracks constituting a group. A width of a read track of the read element is slightly narrower than (70% to 95% of) a track width formed on a tape. When the head is in the on-track state, the pilot signals are detected only from the track that is being read. In turn, if the tracking is inadvertently shifted and the read element contacts an adjacent track, the pilot signals from the adjacent track are detected as cross talk. It is also possible to perform the tracking in accordance with a so-called ATF system wherein the tape feed rate is controlled depending on an amount of the pilot signals leaking from the adjacent track.

Although the read tracking is performed by controlling the tape feed rate in the above examples, it is also possible to perform the read tracking by using a moving head as the read head.

Figure 7:
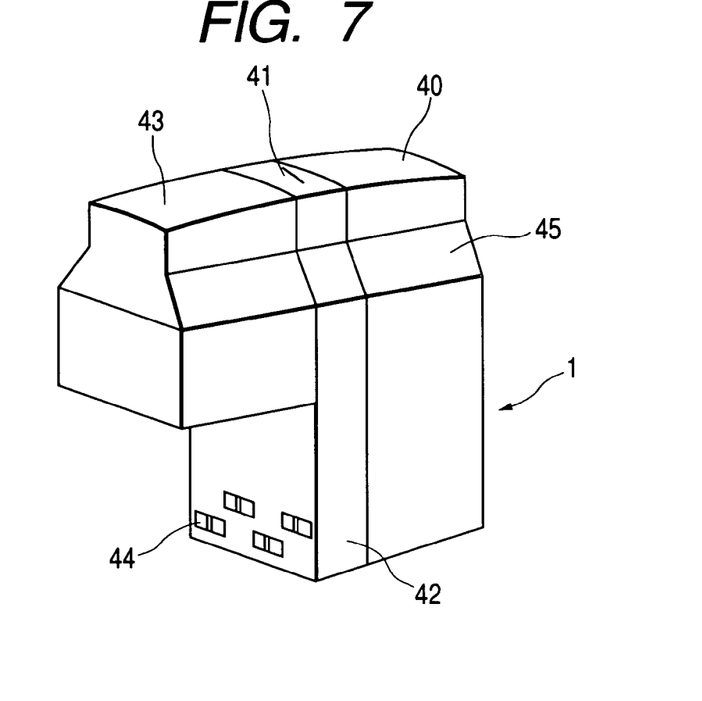
FIG. 7 is a perspective view showing a multitrack thin film write head of the present invention.

Fabrication processes of the write head and the read head used in the above embodiment will hereinafter be described. FIG. 7 is a diagram for illustrating one embodiment of the multitrack thin film write head 1 of the present invention. The multitrack thin film write head 1 has a main substrate 40, a head 41 formed on the main substrate 40 and having a plurality of write elements of an identical azimuth, a protection film 42 for protecting the head 41, an auxiliary substrate 43, electrode terminals 44, and a sliding width control groove 45.

Figure 8:
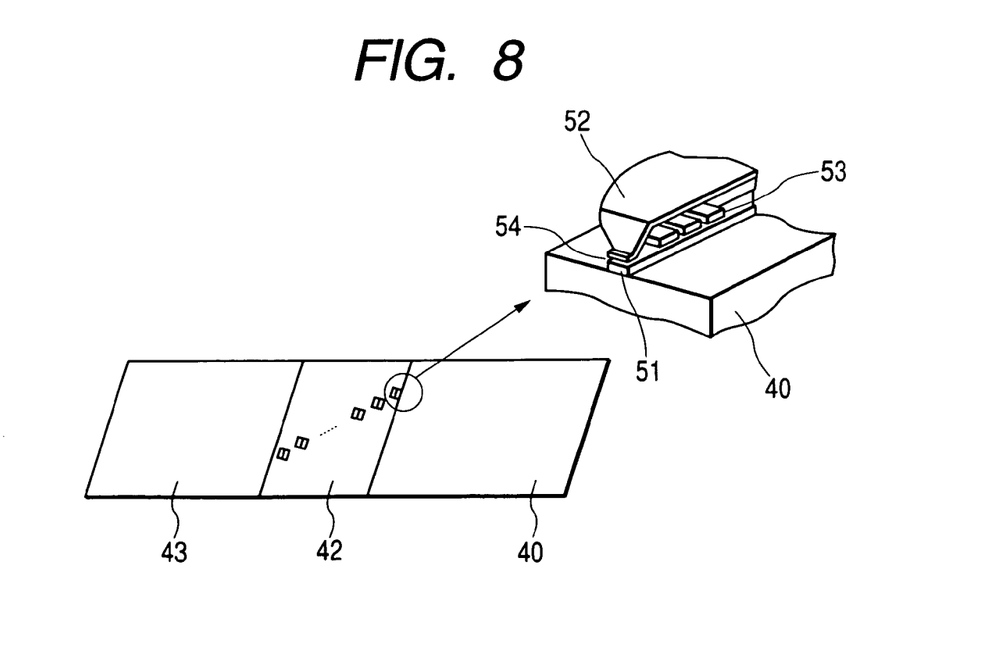
FIG. 8 is a partially enlarged view of the multitrack thin film write head of FIG. 7.

Shown in FIG. 8 are a sliding surface of the multitrack thin film write head and an internal structure of each of the write elements. In the multitrack thin film write head, first to N-th write elements are multilayered sequentially with a predetermined shift being defined between the adjacent write elements so as to form a group of write tracks of an identical azimuth. A lower core 51, an upper core 52, coils 53, and a write gap 54 are also shown in FIG. 8.

Figure 9:
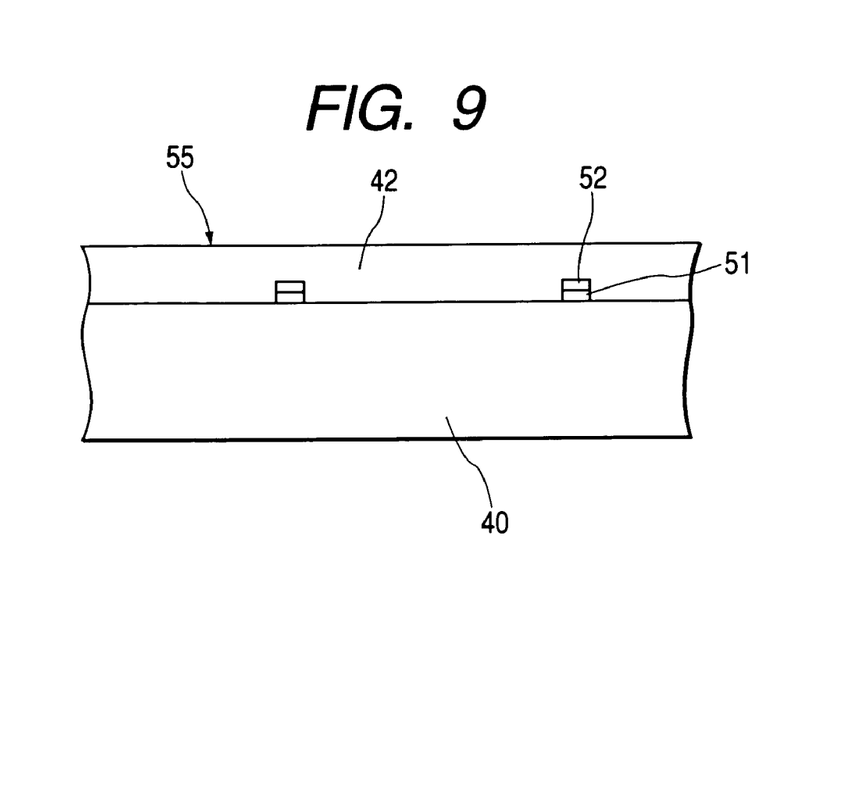
FIG. 9 is a diagram for illustrating a fabrication process of the multitrack thin film write head of FIG. 7.
Figure 10:
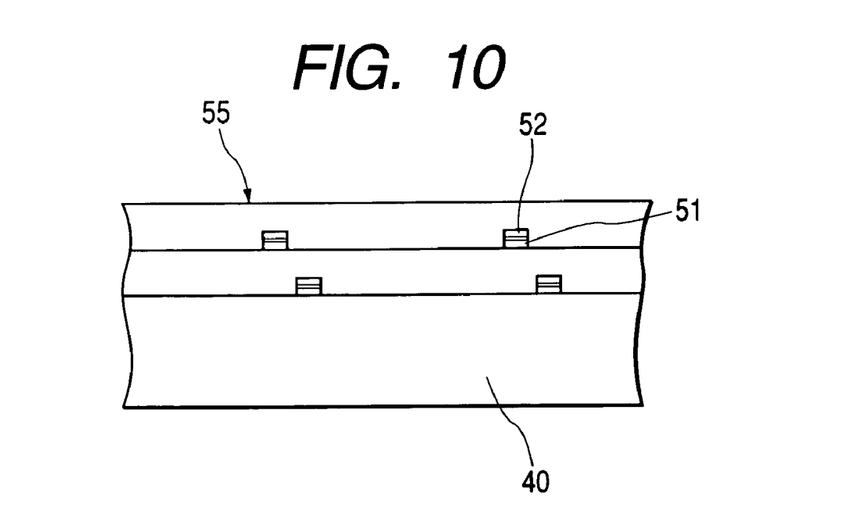
FIG. 10 is a diagram for illustrating the fabrication process of the multitrack thin film write head of FIG. 7.

A fabrication process of the multitrack thin film write head will hereinafter be described with reference to FIGS. 9 to 13. Referring to FIG. 9, the first write elements 51 and 52 and the protection film 42 are formed on the main substrate 40 by employing a thin film formation technology, photo-lithography, ion beam technology or the like, and then a surface 55 of the protection film is made flat by lapping, milling, or the like. After that, second write elements and a protection film are formed at a position that is shifted from the first write element by a predetermined amount as shown in FIG. 10, followed by the flattening in the same manner as in the formation of the first write elements. This process is repeated for N times to complete the head 41.

Figure 11A:
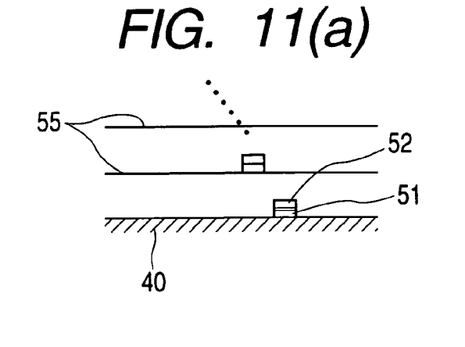
FIG. 11A to 11D are diagrams for illustrating the fabrication process of the multitrack thin film write head of FIG. 7.
Figure 11B:
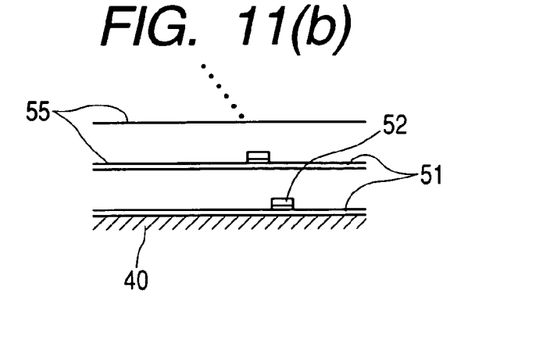
Figure 11C:
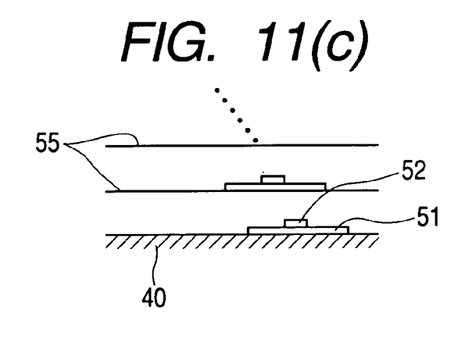
Figure 11D:
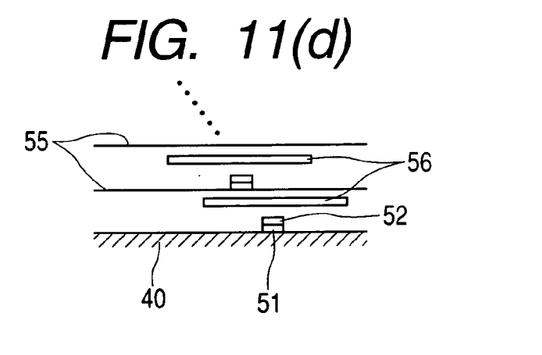

Widths of the lower and upper cores 51 and 52 (equivalent to the track widths) of the write head may be equal to each other as shown in FIG. 11A or changed so that the width of the lower core 51 is larger as shown in FIGS. 11B and 11C. As shown in FIG. 11D, by forming a shield film 56 of highly magnetic-permeable material between the adjacent write elements, it is possible to attain good write characteristic free from cross talk since the shield film 56 suppresses interference among the coils of the write elements. This shield effect can be achieved also by a structure shown in FIGS. 11C and 11D if the width of the lower core is properly selected.

Figure 12:
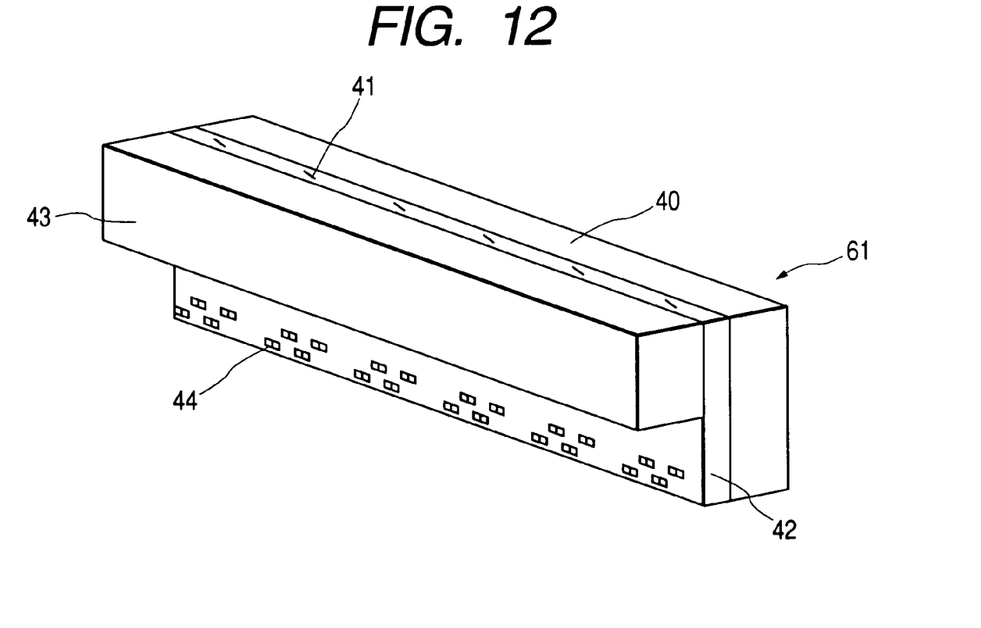
FIG. 12 is a diagram for illustrating the fabrication process of the multitrack thin film write head of FIG. 7.
Figure 13:
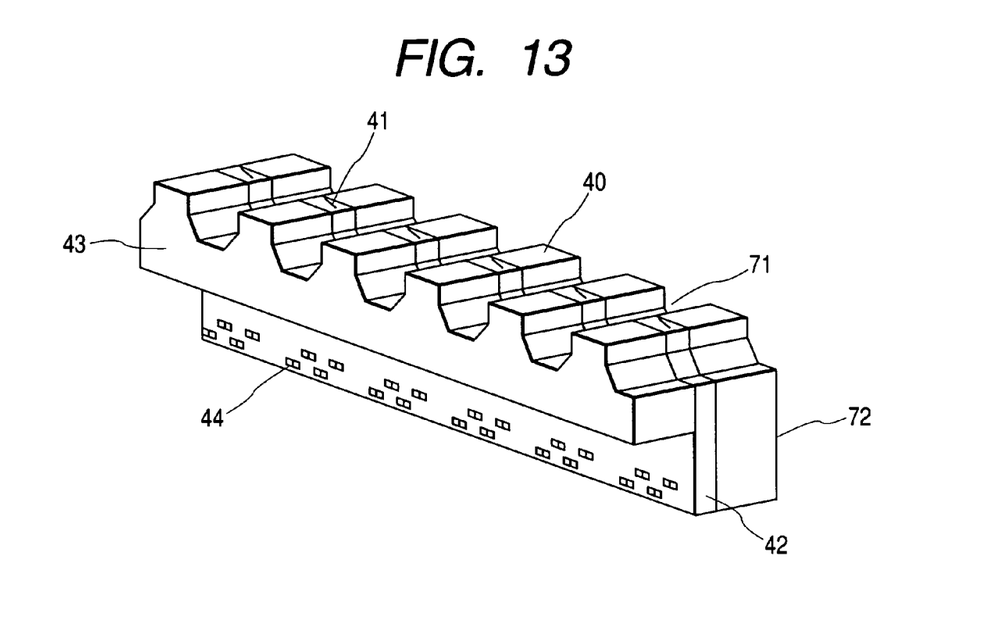
FIG. 13 is a diagram for illustrating the fabrication process of the multitrack thin film write head of FIG. 7.

Referring to FIG. 12, a bonding block 61 is then formed by bonding the auxiliary substrate 43 to the main substrate 40 having the heads 41 and the protection films 42 using adhesive such as a resin. Subsequently, sliding width control grooves 71 shown in FIG. 13 are formed by using a cutting device such as a dicing-saw or a wire-saw to obtain a bonding block 72 having a predetermined sliding width.

Figure 14:
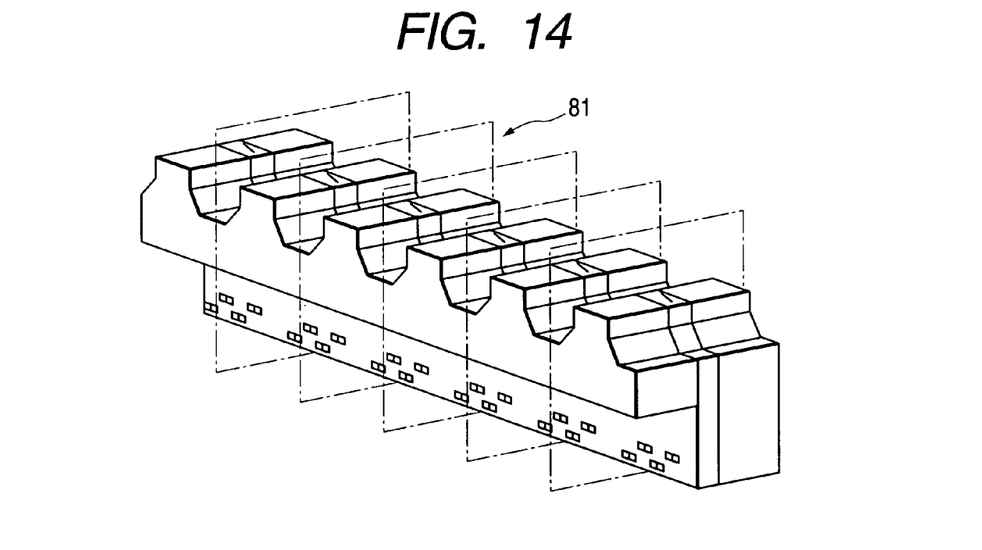
FIG. 14 is a diagram for illustrating the fabrication process of the multitrack thin film write head of FIG. 7.

A sliding surface of the bonding block 72 is then curved as shown in FIG. 14 to be cut along virtual lines 81. Thus, the multitrack thin film head 1 shown in FIG. 7 is obtained. Although the sliding width control grooves are formed in advance of the curving processing in this example, the sliding width control grooves may be formed after subjecting the bonding block 61 to the curving processing.

Figure 15:
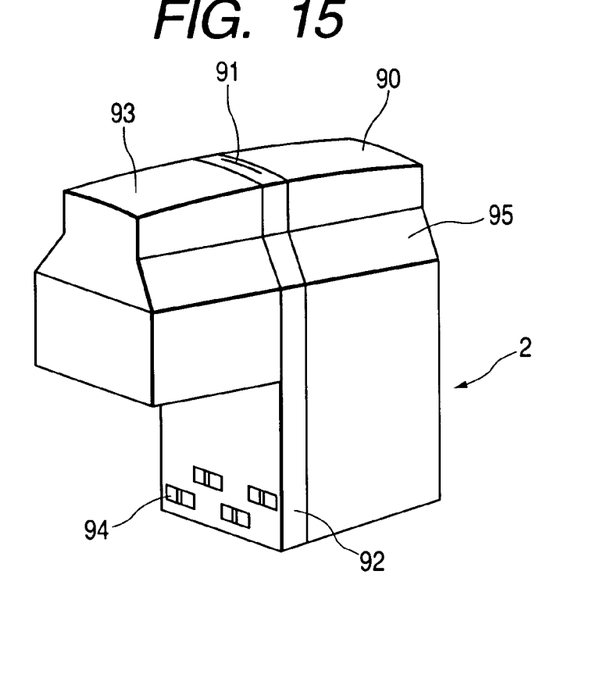
FIG. 15 is a perspective view showing a multitrack magnetoresistive effect (MR) head of the present invention.

A fabrication process of the multitrack read head of the present invention will hereinafter be described. Shown in FIG. 15 is one embodiment of the multitrack magnetoresistive effect head (MR head) 2 of the present invention. The multitrack magnetoresistive effect head 2 has a main substrate 90, a head unit 91 formed on the main substrate 90 and having a plurality of MR heads of an identical azimuth, a protection film 92 for protecting the head unit 91, an auxiliary substrate 93, electrode terminals 94, and a sliding width control groove 95.

Figure 16:
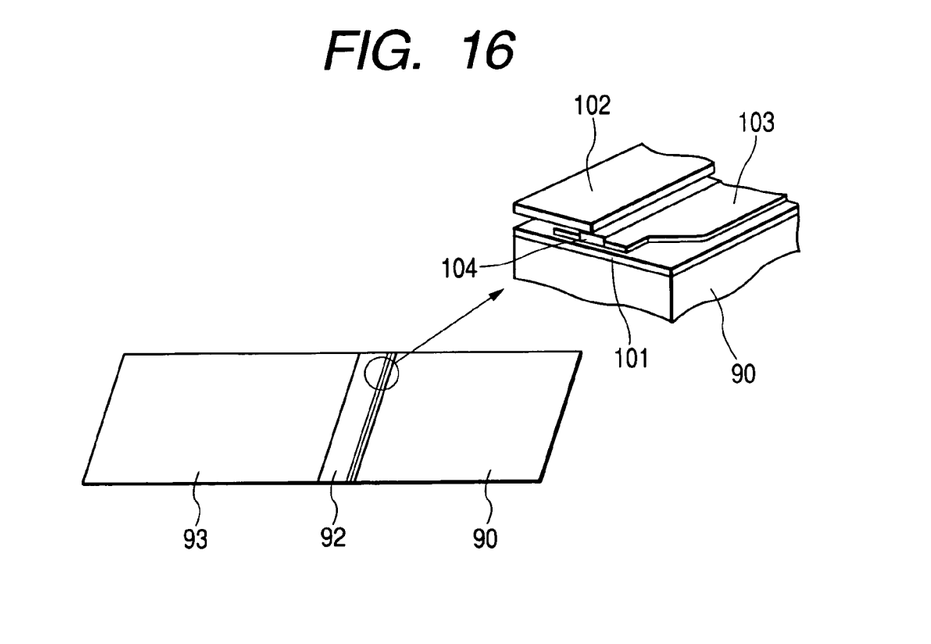
FIG. 16 is a partially enlarged view of the multitrack MR head of FIG. 15.

Shown in FIG. 16 are a sliding surface of the multitrack MR head and an internal structure of each of the MR heads. In the multitrack MR head, first to N-th MR heads are multilayered or formed on an identical plane with a predetermined shift being defined between adjacent heads so as to form a group of read tracks of an identical azimuth. A lower shield 101, an upper shield 102, a lead 103, and an MR element unit 104 including the MR elements are shown in FIG. 16.

Figure 17:
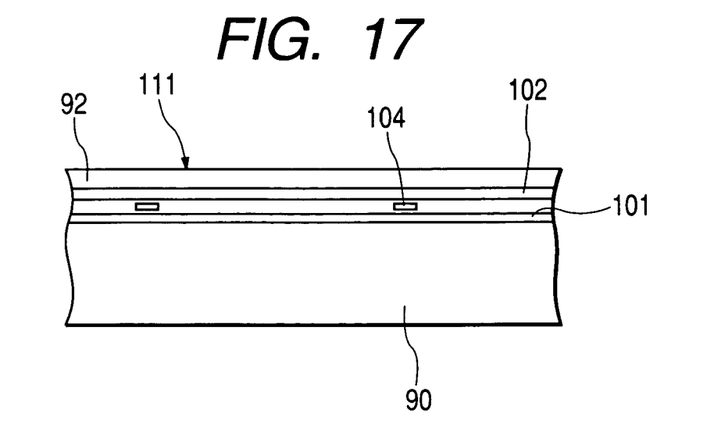
FIG. 17 is a diagram for illustrating a fabrication process of the multitrack MR head of FIG. 15.
Figure 18A:
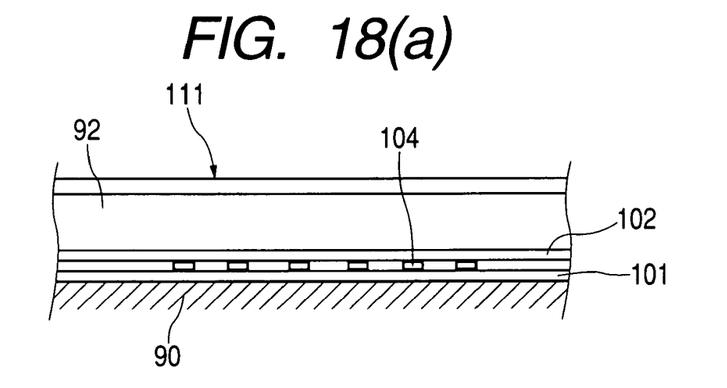
FIGS. 18A and 18B are diagrams for illustrating the fabrication process of the multitrack MR head of FIG. 15.
Figure 18B:
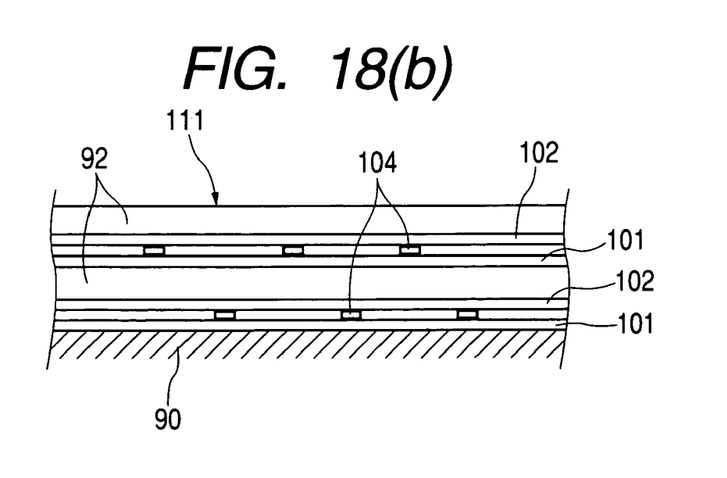

A fabrication process of the multitrack MR head will hereinafter be described with reference to FIGS. 17 to 21. Referring to FIG. 17, the first to N-th MR heads 91 and the protection film 92 are formed on the main substrate 90 by employing a thin film formation technology, photolithography, ion beam technology or the like, and then a surface 111 of the protection film is made flat by lapping. The MR heads are formed on the identical plane as shown in FIG. 18A. Alternatively, the multilayer structure shown in FIG. 18B may be selected for forming the MR heads, so that limitation in track width is eliminated to make it easier to secure a track width required for reading.

Figure 19:
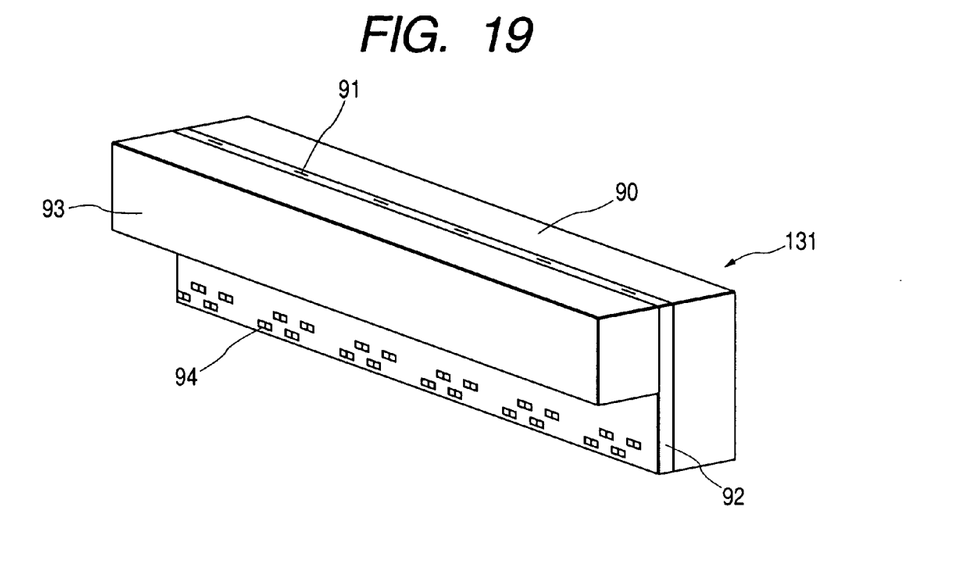
FIG. 19 is a diagram for illustrating the fabrication process of the multitrack MR head of FIG. 15.
Figure 20:
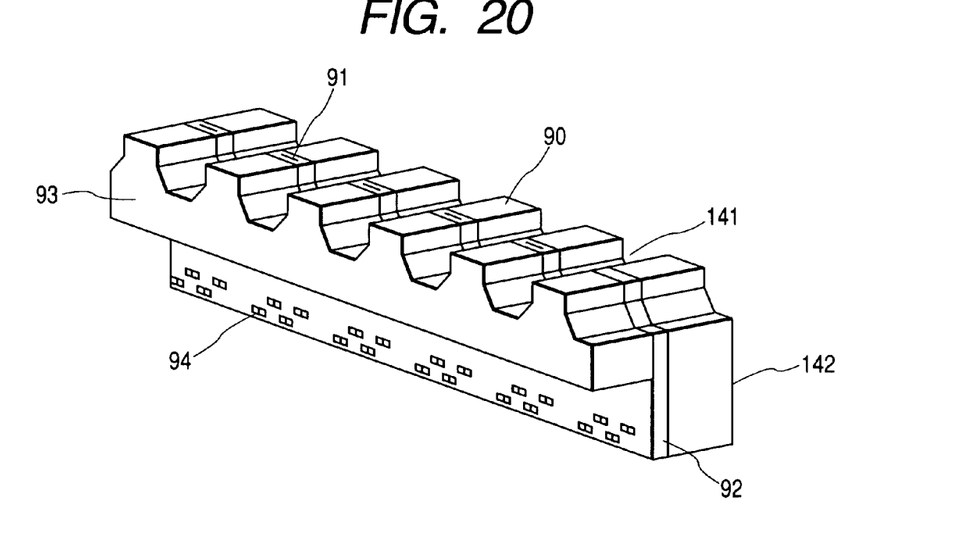
FIG. 20 is a diagram for illustrating the fabrication process of the multitrack MR head of FIG. 15.

Referring to FIG. 19, a bonding block 131 is then formed by bonding the auxiliary substrate 93 to the main substrate 90 having the heads 91 and the protection film 92 using adhesive such as a resin. Subsequently, sliding width control grooves 141 as shown in FIG. 20 are formed by using a cutting device such as a dicing-saw or a wire-saw to obtain a bonding block 142 having a predetermined sliding width.

Figure 21:
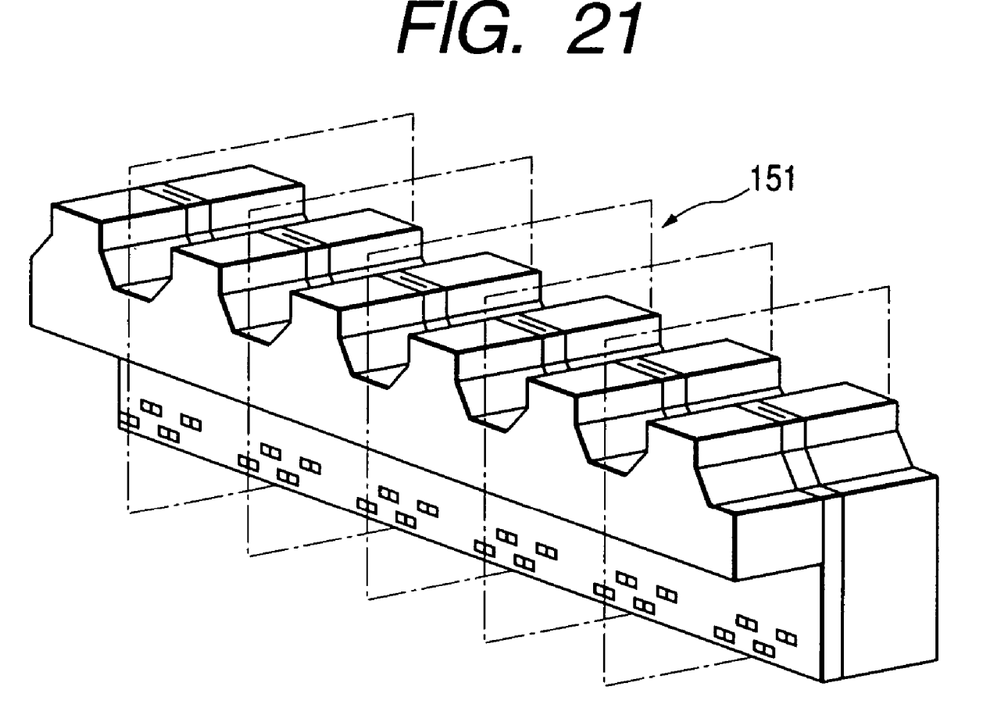
FIG. 21 is a diagram for illustrating the fabrication process of the multitrack MR head of FIG. 15.

A sliding surface of the bonding block 142 is then curved as shown in FIG. 21 to be cut along virtual lines 151. Thus, the multitrack magnetoresistive effect head 2 shown in FIG. 15 is obtained. Although the sliding width control grooves are formed in advance of the curving processing in this example, the sliding width control grooves may be formed after subjecting the bonding block 131 to the curving processing.

According to the above fabrication processes of the write head and the read head, since N tracks are formed on the identical substrate in the integral manner by employing the lithography technique, it is possible to form the tracks with remarkably precise track dimension and track pitch. Further, the above fabrication processes enable to produce a multiple of the multitrack write heads and multitrack read heads at one time, thereby attaining a remarkably high mass production.

As described in the foregoing, it is possible to provide the magnetic recording and reproducing apparatus capable of achieving a good contact with a recording medium, high density recording, and high transfer rate according to the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and range of equivalency of the claims are therefore intended to be embrace therein.

What is claimed is:

1. The magnetic recording and reproducing apparatus of a helical scan system capable of writing or reading signals simultaneously to or from a plurality of tracks while winding a magnetic tape to a rotary drum diagonally, said apparatus comprising:

at least one multitrack write head having N (N being an integer of 2 or more) write elements arranged on the rotary drum along a track width direction in an integral fashion; and at least one multitrack read head having read elements arranged along the track width direction in an integral fashion formed on the rotary drum, the number of the read elements being an integral multiple of N;

wherein the multitrack write head writes signals to a group of N signal tracks aligned parallel on the magnetic tape during one rotation of the rotary drum;

wherein the multitrack read head reads the group of N signal tracks by the use of any one of the read elements;

wherein the multitrack write head is a multitrack thin film magnetic head comprising plural magnetic write elements formed on a substrate, wherein an n-th (n being a natural number) thin film magnetic write element and an (n+1)-th thin film magnetic write element are formed on the substrate with a predetermined shift in a track width direction being provided therebetween, and the magnetic write elements have a structure so that a protection film extending along a direction of film deposition is formed therebetween;

wherein the magnetic multitrack read head comprises plural magnetic read elements formed on a substrate, wherein the magnetic read elements are magnetoresistive effect elements and an n-th (n being a natural number) thin film magnetic read element and an (n+1)-th thin film magnetic read element are formed on the substrate with a predetermined distance extending in a track width direction being provided therebetween; and wherein the multitrack write head forms signal tracks of M (M being an integer of 2 or more) groups each consisting of N (N being an integer of 2 or more) signal tracks aligned parallel on the magnetic tape during one rotation of the rotary drum, wherein the parallel N signal tracks of one of M groups have an identical azimuth angle, and azimuth angles of the adjacent groups each consisting of the N signal tracks are different from each other.

2. The magnetic recording and reproducing apparatus according to claim 1, further comprising a controller for controlling a magnetic tape feed rate in reading the signals, wherein the multitrack write head writes pilot signals having different pilot frequencies to N signal tracks belonging to a group of signal tracks of an identical azimuth, the pilot frequencies of the adjacent signal tracks being different from each other;

the multitrack read head reads the pilot signals from a signal track to be reproduced and another signal track; and the controller controls the tape feed rate based on a ratio of the pilot signal component to be reproduced.

3. The magnetic recording and reproducing apparatus according to claim 1, wherein azimuth angles of the write elements of the multitrack write head and the read elements of the multitrack read head are set to an identical value;

a read width of each of the read elements of the multitrack read head is set to substantially ½ of a signal track width formed on the magnetic tape;

repetition interval of the read elements in the track width direction is set to ½ of a signal track pitch; and the multitrack read head reads signals in accordance with a non-tracking system from the group of signal tracks.

4. The magnetic recording and reproducing apparatus according to claim 1, further comprising a controller for controlling movement of the multitrack read head in the track width direction in reading the signals, wherein the multitrack write head writes servo signals to predetermined regions of the magnetic tape;

the multitrack read head reads the servo signals; and the controller detects a tracking shift amount based on timings at which the servo signals to be reproduced are read to control positioning of the multitrack read head.

5. The magnetic recording and reproducing apparatus according to claim 1, wherein a width of one of the N signal tracks on the magnetic tape positioned most downstream with respect to a tape running direction is larger than that of other signal tracks.

6. The magnetic recording and reproducing apparatus according to claim 1, wherein the N signal tracks have an identical azimuth angle.

7. The magnetic recording and reproducing apparatus according to claim 1, wherein a shield member made from a highly magnetic permeable material is formed between the n-th thin film magnetic write element and the (n+1)-th thin film magnetic write element, the shield member having a width larger than those of cores being exposed to sliding surfaces of both of the thin film magnetic write elements and being exposed to the sliding surfaces.

8. The magnetic recording and reproducing apparatus according to claim 1, wherein a lower core of the (n+1)-th thin film magnetic write element is formed so that the lower core extends in a direction of a sliding surface and at least covers an upper core of the n-th thin film magnetic write element.

9. The magnetic recording and reproducing apparatus of a helical scan system capable of writing or reading signals simultaneously to or from a plurality of tracks while winding a magnetic tape to a rotary drum diagonally, said apparatus comprising:

at least one multitrack write head having N (N being an integer of 2 or more) write elements arranged on the rotary drum along a track width direction in an integral fashion; and at least one multitrack read head having read elements arranged along the track width direction in an integral fashion formed on the rotary drum, the number of the read elements having L (L being an integer equal to or more than N);

wherein the multitrack write head writes signals to a group of N signal tracks aligned parallel on the magnetic tape during one rotation of the rotary drum; and wherein the multitrack read head reads the group of N signal tracks by the use of any one of the read elements;

wherein the multitrack write head is a multitrack thin film magnetic head comprising plural magnetic write elements formed on a substrate, wherein an n-th (n being a natural number) thin film magnetic write element and an (n+1)-th thin film magnetic write element are formed on the substrate with a predetermined shift in a track width direction being provided therebetween, and the magnetic write elements have a structure so that a protection film extending along a direction of film deposition is formed therebetween;

wherein the magnetic multitrack read head comprises plural magnetic read elements formed on a substrate, wherein the magnetic read elements are magnetoresistive effect elements and an n-th (n being a natural number) thin film magnetic read element and an (n+1)-th thin film magnetic read element are formed on the substrate with a predetermined distance extending in a track width direction being provided therebetween; and wherein the multitrack write head forms signal tracks of M (M being an integer of 2 or more) groups each consisting of N (N being an integer of 2 or more) signal tracks aligned parallel on the magnetic tape during one rotation of the rotary drum, wherein the parallel N signal tracks of one of N groups have an identical azimuth angle, and wherein azimuth angles of adjacent groups each consisting of the N signal tracks are different from each other.

10. The magnetic recording and reproducing apparatus according to claim 9, wherein azimuth angles of the write elements of the multitrack write head and the read elements of the multitrack read head are set to an identical value, wherein a read width of each of the read elements of the multitrack read head is set to substantially ½ of a signal track width formed on the magnetic tape, wherein repetition interval of the read elements in the track width direction is set to ½ of a signal track pitch, and wherein the multitrack read head reads signals in accordance with a non-tracking system from the group of signal tracks.

11. The magnetic recording and reproducing apparatus according to claim 9, wherein a width of one of the N signal tracks on the magnetic tape positioned most downstream with respect to a tape running direction is larger than that of other signal tracks.

12. The magnetic recording and reproducing apparatus according to claim 9, wherein the N signal tracks have an identical azimuth angle.

13. The magnetic recording and reproducing apparatus according to claim 9, wherein a shield member made from a highly magnetic permeable material is formed between the n-th thin film magnetic write element and the (n+1)-th thin film magnetic write element, the shield member having a width larger than those of cores being exposed to sliding surfaces of both of the thin film magnetic write elements and being exposed to the sliding surfaces.

14. The magnetic recording and reproducing apparatus according to claim 9, wherein a lower core of the (n+1)-th thin film magnetic write element is formed so that the lower core extends in a direction of the sliding surface and at least covers an upper core of the n-th thin film magnetic write element.

* * * * *